(12) United States Patent
Zhang

(10) Patent No.: US 7,855,531 B2
(45) Date of Patent: Dec. 21, 2010

(54) CHARGE AND DISCHARGE CONTROL CIRCUIT AND BATTERY DEVICE

(75) Inventor: Wei Zhang, Chiba (JP)

(73) Assignee: Seiko Instruments Inc., Chiba (JP)

( * ) Notice: Subject to any disclaimer, the term of this patent is extended or adjusted under 35 U.S.C. 154(b) by 795 days.

(21) Appl. No.: 11/840,561

(22) Filed: Aug. 17, 2007

(65) Prior Publication Data

US 2008/0048620 A1 Feb. 28, 2008

(30) Foreign Application Priority Data

Aug. 24, 2006 (JP) ............................. 2006-227741
Jul. 6, 2007 (JP) ............................. 2007-178837

(51) Int. Cl.
*H02J 7/00* (2006.01)
(52) U.S. Cl. .................. 320/134; 320/135; 320/136
(58) Field of Classification Search .............. 320/134, 320/135, 136
See application file for complete search history.

(56) References Cited

U.S. PATENT DOCUMENTS 5,959,437 A * 9/1999 Hamaguchi ................. 320/134
2005/0182987 A1* 8/2005 Sakurai ...................... 713/340

FOREIGN PATENT DOCUMENTS

JP 2002-176730 A 6/2002

* cited by examiner

*Primary Examiner*—Edward Tso
*Assistant Examiner*—Samuel Berhanu
(74) *Attorney, Agent, or Firm*—Brinks Hofer Gilson & Lione

(57) ABSTRACT

When pulse charging is performed in an overcharge state or an overdischarge state in a charge and discharge control circuit and a battery device, a problem in that a pseudo overcurrent phenomenon occurs repeatedly to hinder normal operations of the charge and discharge control circuit and the battery device is addressed, thereby providing a safe battery device. Thus, there are provided a charge and discharge control circuit and a battery device having a structure in which charge overcurrent detection in the overcharge state and discharge overcurrent detection in the overdischarge state are invalidated.

6 Claims, 3 Drawing Sheets

CHARGE AND DISCHARGE CONTROL CIRCUIT AND BATTERY DEVICE

This application claims priority under 35 U.S.C. §119 to Japanese Patent Application Nos. JP2006-227741 filed Aug. 24, 2006, and JP2007-178837 filed Jul. 6, 2007, the entire content of which is hereby incorporated by reference.

BACKGROUND OF THE INVENTION

1. Field of the Invention

The present invention relates to a charge and discharge control circuit for controlling charge and discharge of a battery and a battery device including the charge and discharge control circuit.

2. Description of the Related Arts

These days, various mobile electronic devices are used. In such situation, each of the electronic devices is operated by an internal battery device. The battery device includes a charge and discharge control circuit for detecting overcharge and overdischarge of a battery or an overcurrent to control the charge and discharge of the battery, thereby realizing normal operation. A detection signal from each detection circuit is transferred to a control circuit through a delay circuit. The control circuit controls a switching element for controlling the charge and discharge. The delay circuit delays the detection signal in order to prevent erroneous detection. The delay circuit normally includes an oscillation circuit and a frequency division circuit and is provided common to the respective detection circuits in view of the circuit scale (see, for example, JP 2002-176730 A).

A conventional charge and discharge control circuit and a conventional battery device will be described. FIG. 4 is a schematic block diagram showing the conventional charge and discharge control circuit and the conventional battery device.

A battery device 200 includes a battery 201 having one end connected with an external terminal 204 and another end connected with an external terminal 205 via a switching circuit 203 capable of limiting a current. The battery 201 is connected in parallel with a charge and discharge control circuit 202 for detecting a voltage and a current of the battery 201 to control the charge and discharge of the battery 201. A charger 301 for charging the battery 201 or a load 302 is connected between the external terminal 204 and the external terminal 205.

The charge and discharge control circuit 202 includes an overcharge detection circuit 306 for generating an overcharge detection signal when the voltage of the battery 201 becomes equal to or larger than an upper limit of a chargeable voltage, an overdischarge detection circuit 307 for generating an overdischarge detection signal when the voltage of the battery 201 becomes smaller than a lower limit of the chargeable voltage, an overcurrent detection circuit 308 for generating an overcurrent detection signal when a current of the switching circuit 203 becomes equal to or larger than an upper limit current, a delay circuit 309 for calculating a delay time for each of the detection signals, and a logic circuit 305 for generating signals for controlling the switching circuit 203 based on the detection signals determined by the delay circuit 309.

The switching circuit 203 is controlled to turn off in the case of an overcharge state, an overdischarge state, or an overcurrent state, thereby stopping a charge current or a discharge current of the battery 201.

However, in each of the conventional charge and discharge control circuit and the conventional battery device, when the charger which performs pulse charging and the load are connected with the battery device, there is a problem in that a pseudo overcurrent state and a release are repeated in the overcharge state or the overdischarge state to hinder the normal operations of the charge and discharge control circuit and the battery device.

For example, when the charger 301 which performs intermittent pulse charging and the load 302 are simultaneously connected between the external terminals 204 and 205 in the overdischarge state, a pseudo discharge overcurrent may be generated even though a discharge current does not flow.

FIG. 3 shows the pseudo discharge overcurrent in the overdischarge state of the battery. In the overdischarge state, a discharging FET 303 is being turned OFF in response to an output of the logic circuit 305, so the discharge current does not flow. At this time, the charge current flows through a parasitic diode of the discharging FET 303. During a period Ton when there is a charge pulse from the charger 301, the charge current flows from the charger 301 to the battery 201, and a voltage at a terminal 103 has a voltage value smaller than a voltage value at a terminal 102 by that of a forward voltage Vf of the parasitic diode. During a period Toff when there is no charge pulse from the charger 301, both the discharge current and the charge current do not flow, so the voltage at the terminal 103 has a voltage value larger than the voltage value at the terminal 102 by that of a battery voltage Vbattery. When the voltage value of the larger value becomes equal to or larger than a predetermined value, the overcurrent detection circuit 308 determines that the charge overcurrent generates, so a pseudo discharge overcurrent state occurs. On the other hand, because the charge current flows from the charger 301 to the battery 201 during the period Ton when there is the charge pulse from the charger 301, the battery voltage becomes equal to or larger than a predetermined value, so the overdischarge detection circuit 307 determines that the overdischarging is released. A short time is normally set as an overcurrent delay time in order to prevent the short circuit of the load. Therefore, when the delay circuit is commonly used, the pseudo discharge overcurrent generates again before the lapse of the delay time for releasing the overdischarging. Thus, it is likely that the overdischarging cannot be released.

In such a state, the charging is continuously performed without releasing the discharge overcurrent state. Even when the voltage of the battery 201 becomes equal to or larger than the upper limit value, it is likely that the overcharge state cannot be detected. Even in the case of the overcharge state, the same problem occurs. Therefore, there may occur a case where the overcharge state and the overdischarge state are not reasonably released, with the result that the charge and discharge control circuit and the battery device cannot be normally operated, thereby reducing the safety.

SUMMARY OF THE INVENTION

The present invention has been made in view of the above-mentioned points. An object of the present invention is to provide a charge and discharge control circuit with high safety and a battery device including the charge and discharge control circuit.

According to the present invention, in order to solve the above-mentioned problems, there is provided a charge and discharge control circuit for controlling charge and discharge of a battery, which includes means for invalidating a charge overcurrent detection signal from an overcurrent detection circuit in an overcharge state of the battery and means for invalidating a discharge overcurrent detection signal from the overcurrent detection circuit in an overdischarge state of the battery.

According to the present invention, there is provided a battery device which includes a battery, a current limiting circuit for limiting a charge current or a discharge current of the battery, and the above-mentioned charge and discharge control circuit.

According to the present invention, the means for invalidating the charge overcurrent detection signal from the overcurrent detection circuit in the overcharge state of the battery and the means for invalidating the discharge overcurrent detection signal from the overcurrent detection circuit in the overdischarge state of the battery are provided to a charge and discharge control circuit including a delay circuit used common to respective detection circuits and a battery device including the charge and discharge control circuit. Therefore, even when a charger which performs pulse charging is connected with the battery device, erroneous detection of the overcurrent can be prevented, so it is possible to provide the charge and discharge control circuit with high safety and the battery device including the charge and discharge control circuit.

DESCRIPTION OF THE PREFERRED EMBODIMENTS

Figure 1:
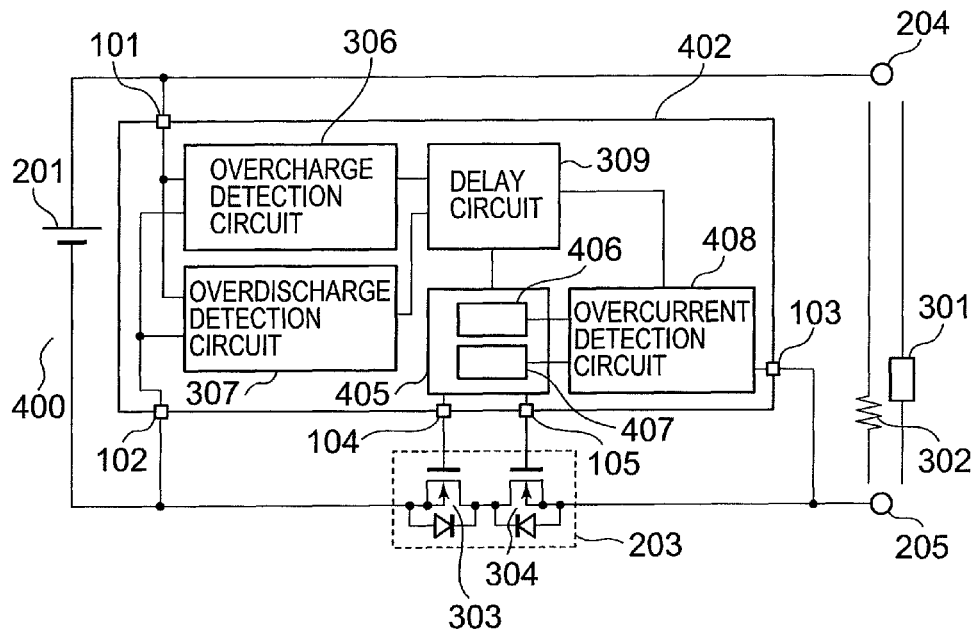
FIG. 1 is a schematic block diagram showing a charge and discharge control circuit and a battery device.

Hereinafter, an embodiment mode of the present invention will be described in detail with reference to the accompanying drawings. FIG. 1 is a schematic block diagram showing a charge and discharge control circuit and a battery device.

A battery device 400 includes a battery 201 having one end connected with an external terminal 204 and another end connected with an external terminal 205 via a switching circuit 203 capable of limiting a current. The battery 201 is connected in parallel with a charge and discharge control circuit 402 for detecting a voltage and a current of the battery 201 to control the charge and discharge of the battery 201. A charger 301 for pulse-charging the battery 201 or a load 302 is connected between the external terminal 204 and the external terminal 205.

The switching circuit 203 includes an FET 303 having a parasitic diode whose charge current flows in a forward direction and an FET 304 having a parasitic diode whose discharge current flows in a forward direction.

The charge and discharge control circuit 402 outputs a charge stop signal or a discharge stop signal for turning off the switching circuit 203 to the switching circuit 203 in the case of an overcharge state, an overdischarge state, or an overcurrent state. When the battery 201 is in a normal state, the charge and discharge control circuit 402 outputs a charge enable signal or a discharge enable signal for turning on the switching circuit 203 to the switching circuit 203.

The charge and discharge control circuit 402 includes an overcharge detection circuit 306 connected with terminals 101 and 102, for detecting an overcharge state in which the voltage of the battery 201 is equal to or larger than an upper limit of a chargeable voltage, an overdischarge detection circuit 307 connected with the terminals 101 and 102, for detecting an overdischarge state in which the voltage of the battery 201 is smaller than a lower limit of the chargeable voltage, an overcurrent detection circuit 408 connected with a terminal 103, for detecting an overcurrent state in which a current of the switching circuit 203 is equal to or larger than an upper limit current, a delay circuit 309 connected with the respective detection circuits, for delaying each of detection signals by a delay time corresponding to each detection time, and a logic circuit 405 connected with the delay circuit 309, for controlling the switching circuit 203 based on the detection signals outputted from the delay circuit.

The logic circuit 405 includes a charge overcurrent erroneous detection prevention means 406 for invalidating the detection of a charge overcurrent in the overcharge state and a discharge overcurrent erroneous detection prevention means 407 for invalidating the detection of a discharge overcurrent in the overdischarge state.

Next, the operation of the battery device 400 will be described.

When the battery 201 becomes the overcharge state, the overcharge detection circuit 306 outputs an overcharge detection signal to the delay circuit 309. When the overcharge detection signal continues for a predetermined time, the delay circuit 309 outputs the overcharge detection signal to the logic circuit 405. Upon receiving the overcharge detection signal, the logic circuit 405 outputs the charge stop signal to the FET 304. As a result, the FET 304 is controlled to turn off and the parasitic diode of the FET 304 passes only a charge current, thereby stopping the charge current. When the battery 201 becomes the normal state, the overcharge detection circuit 306 outputs an overcharge release signal to the delay circuit 309. When the overcharge release signal continues for a predetermined time, the delay circuit 309 outputs the overcharge release signal to the logic circuit 405. Upon receiving the overcharge release signal, the logic circuit 405 outputs the charge enable signal to the FET 304. Then, the FET 304 is turned on.

When the battery 201 becomes the overdischarge state, the overdischarge detection circuit 307 outputs an overdischarge detection signal to the delay circuit 309. When the overdischarge detection signal continues for a predetermined time, the delay circuit 309 outputs the overdischarge detection signal to the logic circuit 405. Upon receiving the overdischarge detection signal, the logic circuit 405 outputs the discharge stop signal to the FET 303. As a result, the FET 303 is controlled to turn off and the parasitic diode of the FET 303 passes only a charge current, thereby stopping the discharge current. When the battery 201 becomes the normal state, the overdischarge detection circuit 307 outputs an overdischarge release signal to the delay circuit 309. When the overdischarge release signal continues for a predetermined time, the delay circuit 309 outputs the overdischarge release signal to the logic circuit 405. Upon receiving the overdischarge release signal, the logic circuit 405 outputs the charge enable signal to the FET 303. Then, the FET 303 is turned on.

When any problem occurs in the charger 301 or the load 302 and the current of the switching circuit 203 becomes equal to or larger than the upper limit current, a voltage difference between the terminal 102 and the terminal 103 of the charge and discharge control circuit 402 becomes equal to or larger than a predetermined value by an on-resistance of the switching circuit 203. Then, the overcurrent detection circuit 408 outputs a charge overcurrent detection signal or a discharge overcurrent detection signal to the delay circuit 309. When the signals are continuously outputted for a predetermined time, the delay circuit 309 outputs the signals to the logic circuit 405. Upon receiving the charge overcurrent detection signal, the logic circuit 405 outputs the charge stop signal to the FET 304. Upon receiving the discharge overcurrent detection signal, the logic circuit 405 outputs the discharge stop signal to the FET 303. Therefore, the discharge current and the charge current are stopped. When the current of the switching circuit 203 becomes the normal state, the overcurrent detection circuit 408 outputs a charge overcurrent release signal or a discharge overcurrent release signal to the delay circuit 309. When the signals are continuously outputted for a predetermined time, the delay circuit 309 outputs the signals to the logic circuit 405. Upon receiving the signals, the logic circuit 405 outputs release signals to the FET 303 and the FET 304 to turn on the FET 303 and the FET 305.

Here, the case where the charger 301 for pulse-charging the battery 201 and the load 302 are simultaneously connected between the external terminal 204 and the external terminal 205 will be described. In the case of the pulse charging, there are a period Ton when there is a charge pulse and a period Toff when there is no charge pulse. A charger voltage Vcharge is applied for the period Ton.

Figure 2:
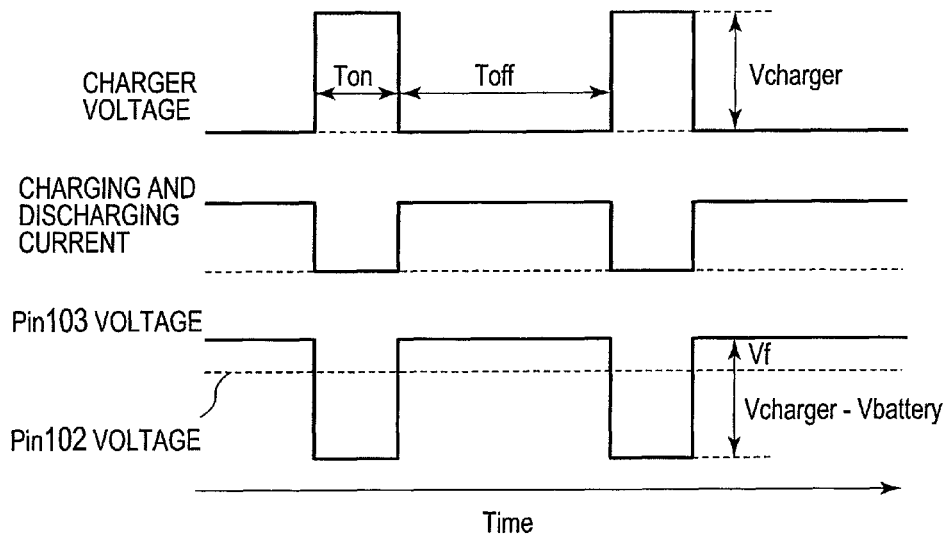
FIG. 2 shows a pseudo charge overcurrent in an overcharge state of a battery.

FIG. 2 shows a pseudo charge overcurrent in the overcharge state of the battery 201.

It is assumed that the battery 201 is in the overcharge state and thus the FET 304 is turned off by the charge and discharge control circuit 402 to stop the charge current. During the period Toff, the charge current flows from the battery 201 to the load 302 and a voltage at the terminal 103 has a voltage value larger than a voltage value at the terminal 102 by that of a forward voltage Vf of the parasitic diode of the FET 304. During the period Ton, the charge current does not flow from the battery 201 to the load 302 because of a voltage of the charger 301. Therefore, the parasitic diode of the FET 304 is reversely biased, so the voltage at the terminal 103 has a voltage value smaller than the voltage value at the terminal 102 by that of a voltage obtained by subtracting the battery voltage Vbattery from the charger voltage Vcharge.

When the voltage value becomes equal to or larger than a predetermined value, the overcurrent detection circuit 408 erroneously determines that the charge overcurrent is generated even though the charge current does not flow, and then generates the charge overcurrent detection signal. The delay circuit 309 delays the charge overcurrent detection signal by a predetermined time and outputs the delayed charge overcurrent detection signal to the logic circuit 405.

At this time, the charge overcurrent erroneous detection prevention means 406 provided in the logic circuit 405 determines that the charge overcurrent detection signal is a detection signal generated during the overcharging and invalidates the charge overcurrent detection signal. Then, the charge overcurrent erroneous detection prevention means 406 outputs a signal for inhibiting the detection of the charge overcurrent to the overcurrent detection circuit 408.

In the overcharge state, the charge current is disabled, so there generates no charge overcurrent. Therefore, even when the overcurrent detection circuit 408 neglects the charge overcurrent, a problem does not occur.

Therefore, according to the charge and discharge control circuit having the above-mentioned circuit structure, even when the charger which performs the pulse charging is connected with the battery device, the erroneous detection of the charge overcurrent in the overcharge state can be prevented, so it is possible to provide the charge and discharge control circuit with high safety and the battery device including the charge and discharge control circuit.

Figure 3:
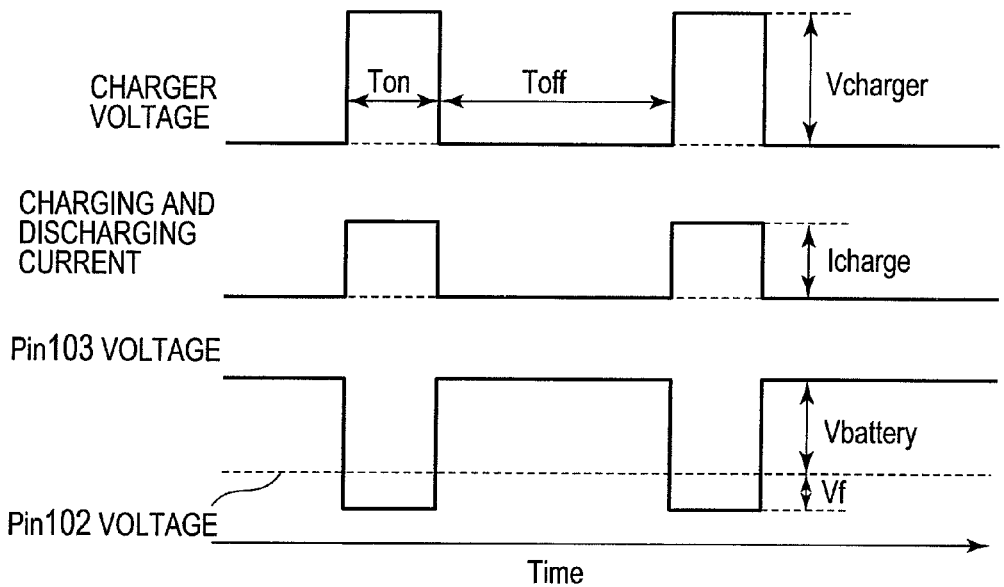
FIG. 3 shows a pseudo discharge overcurrent in an overdischarge state of the battery.
Figure 4:
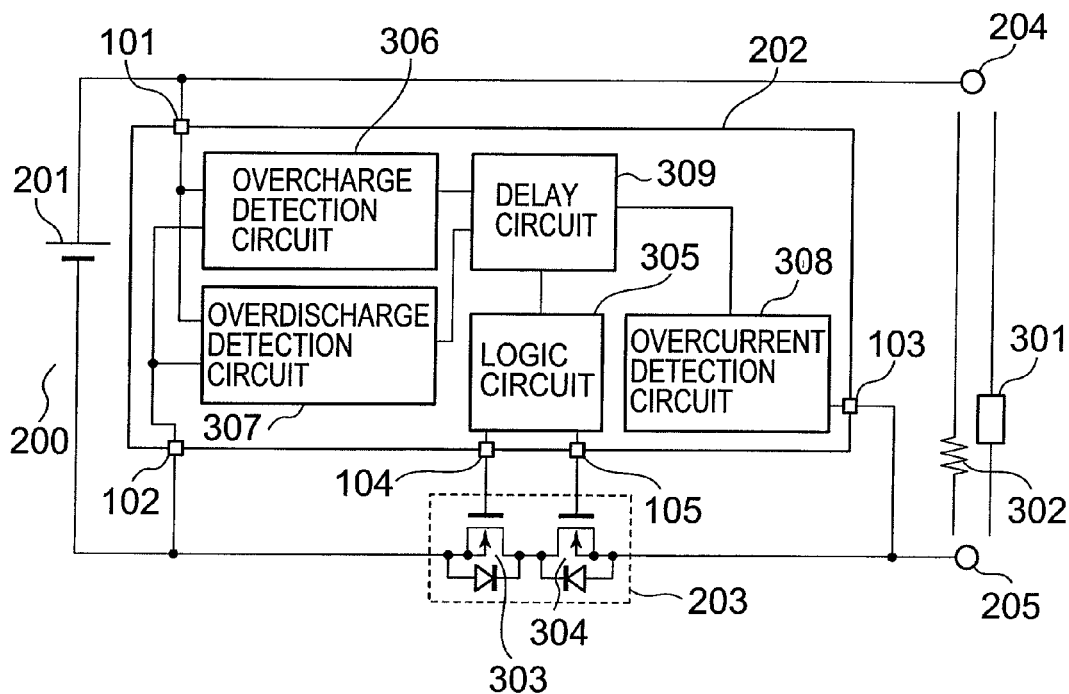
FIG. 4 is a schematic block diagram showing a conventional charge and discharge control circuit and a conventional battery device.

Next, the operation for preventing the erroneous detection of the discharge overcurrent in the overdischarge state will be described. FIG. 3 shows a pseudo discharge overcurrent in the overdischarge state of the battery.

It is assumed that the battery 201 is in the overdischarge state and thus the FET 303 is turned off by the charge and discharge control circuit 402 to stop the discharge current. During the period Ton, the charge current flows from the charger 301 to the battery 201 and the voltage at the terminal 103 has a voltage value smaller than the voltage value at the terminal 102 by that of the forward voltage Vf of the parasitic diode of the FET 303. During the period Toff, the parasitic diode of the FET 303 is reversely biased and the charge current does not flow from the battery 201 to the load 302. Therefore, the terminal 103 becomes a state in which it is connected with the battery 201 through the load 302, so the voltage at the terminal 103 has a voltage value larger than the voltage value at the terminal 102 by that of the battery voltage Vbattery.

When the voltage value of the larger value becomes equal to or larger than a predetermined value, the overcurrent detection circuit 408 erroneously determines that the discharge overcurrent is generated even though the discharge current does not flow, and then generates the discharge overcurrent detection signal. The delay circuit 309 delays the discharge overcurrent detection signal by a predetermined time and outputs the delayed discharge overcurrent detection signal to the logic circuit 405.

At this time, the discharge overcurrent erroneous detection prevention means 407 provided in the logic circuit 405 determines that the discharge overcurrent detection signal is a detection signal generated during the overcharging and invalidates the discharge overcurrent detection signal. Then, the discharge overcurrent erroneous detection prevention means 406 outputs a signal for inhibiting the detection of the discharge overcurrent to the overcurrent detection circuit 408.

Similarly, in the overdischarge state, the discharge current is disabled, so there generates no discharge overcurrent. Therefore, even when the overcurrent detection circuit 408 neglects the discharge overcurrent, a problem does not occur.

Therefore, according to the charge and discharge control circuit having the above-mentioned circuit structure, even when the charger which performs the pulse charging is connected with the battery device, the erroneous detection of the discharge overcurrent in the overdischarge state can be prevented, so it is possible to provide the charge and discharge control circuit with high safety and the battery device including the charge and discharge control circuit.

According to the description of the above-mentioned embodiment mode, the charge overcurrent erroneous detection prevention means 406 and the discharge overcurrent erroneous detection prevention means 407 are constructed to invalidate the charge overcurrent detection signal in the overcharge state of the battery and the discharge overcurrent detection signal in the overdischarge state. A structure may also be used in which the charge overcurrent erroneous detection prevention means 406 outputs the signal for inhibiting the detection of the charge overcurrent to the overcurrent detection circuit 408 in the case of the overcharge state and the discharge overcurrent erroneous detection prevention means 407 outputs the signal for inhibiting the detection of the discharge overcurrent to the overcurrent detection circuit 408 in the case of the overdischarge state.

As described above, even in the case of each of the charge and discharge control circuit including the delay circuit provided common to respective detection circuits and the battery device including the charge and discharge control circuit, the erroneous detection of the charge overcurrent in the overcharge state and the erroneous detection of the discharge overcurrent in the overdischarge state can be prevented. Therefore, even when the charger which performs the pulse charging is connected with the battery device, it is possible to provide the charge and discharge control circuit with high safety and the battery device including the charge and discharge control circuit.

Figure 5:
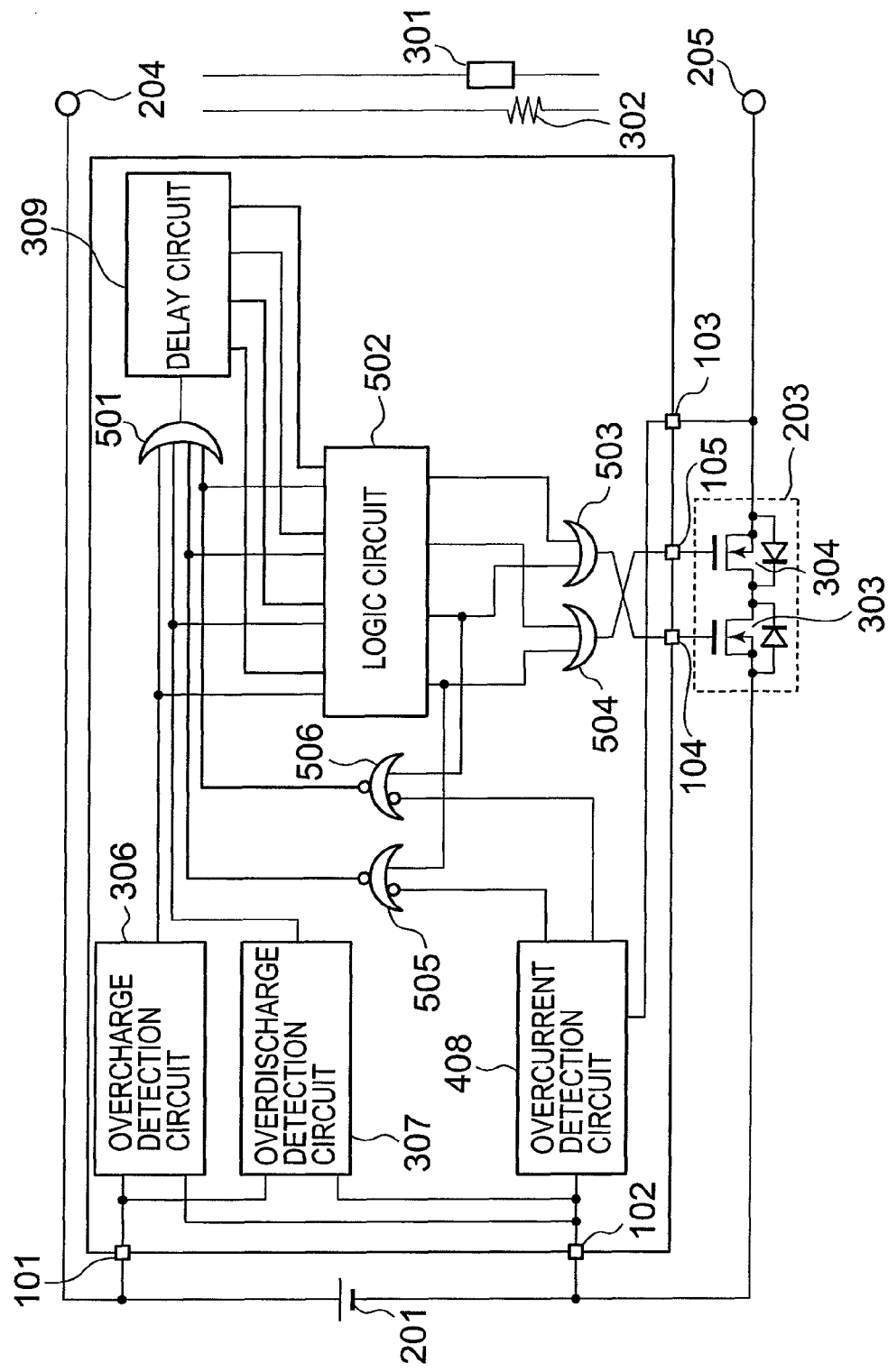
FIG. 5 is a block diagram showing a charge and discharge control circuit and a battery device according to an embodiment of the present invention.

FIG. 5 is a block diagram showing the charge and discharge control circuit and the battery device according to an embodiment of the present invention. In this embodiment, an active high (Hi) state is used for detection. Even when an active Low (Lo) state is used, the same can be expected.

When the battery 201 is charged to have a value equal to or larger than an overcharge detection voltage value, the overcharge detection circuit 306 outputs the overcharge detection signal to the delay circuit 309 through a logic circuit 501. The delay circuit 309 outputs an overcharge detection delay time signal to a logic circuit 502 after the lapse of an overcharge detection delay time. Upon receiving the overcharge detection signal and the overcharge detection delay time signal, the logic circuit 502 outputs an overcharge protection operation signal to the FET 304 for charge control through a logic circuit 504 to turn off the FET 304.

When the battery 201 is charged to have a value equal to or less than an overdischarge detection voltage value, the overdischarge detection circuit 307 outputs the overdischarge detection signal to the delay circuit 309 through a logic circuit 501. The delay circuit 309 outputs an overdischarge detection delay time signal to the logic circuit 502 after the lapse of an overdischarge detection delay time. Upon receiving the overdischarge detection signal and the overdischarge detection delay time signal, the logic circuit 502 outputs an overdischarge protection operation signal to the FET 303 for charge control through a logic circuit 503 to turn off the FET 303.

When the charge current to the battery is charged to have a value equal to or larger than a charge overcurrent value, the overcurrent detection circuit 408 outputs the charge overcurrent detection signal to the delay circuit 309 through a logic circuit 505 and the logic circuit 501. The delay circuit 309 outputs a charge overcurrent detection delay time signal to the logic circuit 502 after the lapse of a charge overcurrent detection delay time. Upon receiving the charge overcurrent detection signal and the charge overcurrent detection delay time signal, the logic circuit 502 outputs a charge overcurrent protection operation signal to the FET 304 for charge control through the logic circuit 504 to turn off the FET 304.

Further, when the discharge current from the battery is charged to have a value equal to or larger than a discharge overcurrent value, the overcurrent detection circuit 408 outputs the discharge overcurrent detection signal to the delay circuit 309 through a logic circuit 506 and the logic circuit 501. The delay circuit 309 outputs a discharge overcurrent detection delay time signal to the logic circuit 502 after the lapse of a discharge overcurrent detection delay time. Upon receiving the discharge overcurrent detection signal and the discharge overcurrent detection delay time signal, the logic circuit 502 outputs a discharge overcurrent protection operation signal to the FET 303 for discharge control through the logic circuit 503 to turn off the FET 303.

Hereinafter, the operation of the battery device in the case where the charge overcurrent is detected in the overcharge state will be described. In the overcharge state, the logic circuit 502 simultaneously outputs the overcharge protection operation signal to the logic circuit 504 and the logic circuit 505. The logic circuit 505 includes a NOR circuit. When at least one of input terminals of the logic circuit 505 is in an Hi level, an output thereof becomes an Lo level. Therefore, even when the overcurrent detection circuit 408 detects the charge overcurrent and outputs the charge overcurrent detection signal to the delay circuit 309, the charge overcurrent detection signal is invalidated by the logic circuit 505.

That is, the erroneous detection of the charge overcurrent in the overcharge state can be prevented. Therefore, even when the charger which performs the pulse charging and the load are connected with the battery device, it is possible to provide the charge and discharge control circuit with high safety and the battery device including the charge and discharge control circuit.

The erroneous detection of the discharge overcurrent in the overdischarge state can be also prevented in the same manner. Therefore, even when the charger which performs the pulse charging and the load is connected with the battery device, it is possible to provide the charge and discharge control circuit with high safety and the battery device including the charge and discharge control circuit.

What is claimed is:

1. A charge and discharge control circuit for controlling a current limiting circuit based on a result obtained by monitoring a voltage of a battery to control charge and discharge of the battery, comprising:

an overcharge detection circuit for detecting an overcharge state of the battery by monitoring the voltage between both ends of the battery;

an overdischarge detection circuit for detecting an overdischarge state of the battery by monitoring the voltage between the both ends of the battery;

an overcurrent detection circuit for detecting one of a charge overcurrent state and a discharge overcurrent state in the battery by monitoring a voltage between both ends of the current limiting circuit;

a delay circuit for delaying a detection signal from the overcharge detection circuit, a detection signal from the overdischarge detection circuit, and a detection signal from the overcurrent detection circuit, the delay circuit being provided common to the overcharge detection circuit, the overdischarge detection circuit, and the overcurrent detection circuit; and a logic circuit for generating a signal for controlling the current limiting circuit based on a detection signal outputted from the delay circuit, wherein the charge and discharge control circuit invalidates detection of a charge overcurrent in the overcharge state and detection of a discharge overcurrent in the overdischarge state.

2. A charge and discharge control circuit according to claim 1, wherein the logic circuit comprises:

charge overcurrent erroneous detection prevention means for invalidating a detection signal of the charge overcurrent in the overcharge state; and discharge overcurrent erroneous detection prevention means for invalidating a detection signal of the discharge overcurrent in the overdischarge state.

3. A charge and discharge control circuit according to claim 1, wherein the logic circuit comprises:

charge overcurrent erroneous detection prevention means for outputting a signal for inhibiting the detection of the charge overcurrent to the overcurrent detection circuit in the overcharge state; and discharge overcurrent erroneous detection prevention means for outputting a signal for inhibiting the detection of the discharge overcurrent to the overcurrent detection circuit in the overdischarge state.

4. A battery device, comprising:

a battery;

a current limiting circuit for limiting one of a charge current and a discharge current of the battery; and a charge and discharge control circuit for controlling the current limiting circuit based on a result obtained by monitoring a voltage of the battery to control charge and discharge of the battery, wherein the charge and discharge control circuit comprises:

an overcharge detection circuit for detecting an overcharge state of the battery by monitoring the voltage between both ends of the battery;

an overdischarge detection circuit for detecting an overdischarge state of the battery by monitoring the voltage between the both ends of the battery;

an overcurrent detection circuit for detecting one of a charge overcurrent state and a discharge overcurrent state in the battery by monitoring a voltage between both ends of the current limiting circuit;

a delay circuit for delaying a detection signal from the overcharge detection circuit, a detection signal from the overdischarge detection circuit, and a detection signal from the overcurrent detection circuit, the delay circuit being provided common to the overcharge detection circuit, the overdischarge detection circuit, and the overcurrent detection circuit; and a logic circuit for generating a signal for controlling the current limiting circuit based on a detection signal outputted from the delay circuit, in which detection of a charge overcurrent is invalidated in the overcharge state and detection of a discharge overcurrent is invalidated in the overdischarge state.

5. A battery device according to claim 4, wherein the logic circuit comprises:

charge overcurrent erroneous detection prevention means for invalidating a detection signal of the charge overcurrent in the overcharge state; and discharge overcurrent erroneous detection prevention means for invalidating a detection signal of the discharge overcurrent in the overdischarge state.

6. A battery device according to claim 4, wherein the logic circuit comprises:

charge overcurrent erroneous detection prevention means for outputting a signal for inhibiting the detection of the charge overcurrent to the overcurrent detection circuit in the overcharge state; and discharge overcurrent erroneous detection prevention means for outputting a signal for inhibiting the detection of the discharge overcurrent to the overcurrent detection circuit in the overdischarge state.

* * * * *